(12) United States Patent
Billingsley et al.

(10) Patent No.: US 7,770,209 B2
(45) Date of Patent: *Aug. 3, 2010

(54) METHOD AND SYSTEM TO DETECT HUMAN INTERACTION WITH A COMPUTER

(75) Inventors: Eric N. Billingsley, Los Gatos, CA (US); Louis M. Monier, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 956 days.

This patent is subject to a terminal disclaimer.

(21) Appl. No.: 11/533,250

(22) Filed: Sep. 19, 2006

(65) Prior Publication Data

US 2007/0074154 A1 Mar. 29, 2007

Related U.S. Application Data

(63) Continuation of application No. 10/186,637, filed on Jun. 28, 2002.

(51) Int. Cl.
```
G06F 7/04       (2006.01)
H04N 7/16       (2006.01)
H04L 9/32       (2006.01)
G06F 21/00      (2006.01)
G06K 9/00       (2006.01)
G06F 17/00      (2006.01)
```
(52) U.S. Cl. .......................... 726/2; 713/178; 713/182; 382/100; 725/11; 705/500
(58) Field of Classification Search .................. 726/2; 713/178, 182; 382/100; 725/11; 705/500
See application file for complete search history.

(56) References Cited

U.S. PATENT DOCUMENTS

| | | | |
|---|---|---|---|
| 4,695,966 | A | 9/1987 | Takakura |
| 4,949,391 | A | 8/1990 | Faulkerson |
| 5,539,868 | A | 7/1996 | Hosoya et al. |
| 6,037,984 | A | 3/2000 | Isnardi et al. |
| 6,195,698 | B1 | 2/2001 | Lillibridge et al. |

(Continued)

FOREIGN PATENT DOCUMENTS

GB 2429094 2/2007

(Continued)

OTHER PUBLICATIONS

The Chaptcha Project, May 29, 2002, http://web.archive.org/web/20020529145520/http://www.captcha.net/.*

(Continued)

*Primary Examiner*—Hoang-Vu A Nguyen-Ba
(74) *Attorney, Agent, or Firm*—Schwegman, Lundberg & Woessner, P.A.

(57) ABSTRACT

A system is provided to monitor a user's interaction with a computer. The system may comprise a reference string generator to generate a random reference string, an image generator to generate an image including the random reference string, a communications module to communicate the image to a client computer for display to a user and to receive user input data and a comparator to compare the random reference string and the user input data to detect human interaction with the computer. The image including the random reference string may be generated such that each character in the random reference string is off-centered.

18 Claims, 7 Drawing Sheets

U.S. PATENT DOCUMENTS

| | | | |
|---|---|---|---|
| 6,209,104 B1 | 3/2001 | Jalili | |
| 6,209,922 B1 | 4/2001 | Klein | |
| 6,243,093 B1 | 6/2001 | Czerwinski et al. | |
| 6,266,158 B1 | 7/2001 | Hata | |
| 6,292,575 B1 | 9/2001 | Bortolussi et al. | |
| 6,397,355 B1 | 5/2002 | Curtis et al. | |
| 6,618,117 B2 | 9/2003 | Silverbrook | |
| 6,636,216 B1 | 10/2003 | Silverbrook et al. | |
| 6,721,423 B1 | 4/2004 | Anderson et al. | |
| 6,750,944 B2 | 6/2004 | Silverbrook et al. | |
| 6,763,515 B1 | 7/2004 | Vazquez et al. | |
| 6,829,748 B1 | 12/2004 | Browne et al. | |
| 6,868,539 B1 | 3/2005 | Travison et al. | |
| 6,886,863 B1 | 5/2005 | Mowry, Jr. et al. | |
| 6,895,507 B1 | 5/2005 | Teppler | |
| 6,915,409 B1 | 7/2005 | Peterson | |
| 6,947,557 B1 | 9/2005 | Megiddo et al. | |
| 7,139,916 B2 | 11/2006 | Billingsley et al. | |
| 7,200,576 B2 | 4/2007 | Steeves et al. | |
| 7,300,058 B2 | 11/2007 | Ogilvie et al. | |
| 2001/0037468 A1 | 11/2001 | Gaddis | |
| 2003/0014412 A1 | 1/2003 | Collart | |
| 2003/0204569 A1 | 10/2003 | Andrews et al. | |
| 2004/0003258 A1 | 1/2004 | Billingsley et al. | |
| 2004/0199597 A1 | 10/2004 | Libbey et al. | |
| 2005/0138376 A1 | 6/2005 | Fritz et al. | |
| 2005/0140675 A1 | 6/2005 | Billingsley et al. | |
| 2005/0198580 A1 | 9/2005 | Hua et al. | |
| 2005/0229251 A1 | 10/2005 | Chellapilla et al. | |
| 2006/0095578 A1 | 5/2006 | Paya et al. | |
| 2006/0136219 A1 | 6/2006 | Wang | |
| 2006/0287963 A1 | 12/2006 | Steeves et al. | |
| 2007/0005500 A1 | 1/2007 | Steeves et al. | |
| 2007/0026372 A1 | 2/2007 | Huelsbergen | |
| 2007/0250920 A1 | 10/2007 | Lindsay | |
| 2008/0016551 A1 | 1/2008 | Pinkas et al. | |
| 2008/0050018 A1 | 2/2008 | Koziol | |
| 2008/0066014 A1 | 3/2008 | Misra | |
| 2008/0072293 A1 | 3/2008 | D'Urso | |
| 2008/0209223 A1 | 8/2008 | Nandy et al. | |
| 2009/0094687 A1 | 4/2009 | Jastrebski et al. | |

FOREIGN PATENT DOCUMENTS

| | | |
|---|---|---|
| WO | WO-0041103 A1 | 7/2000 |
| WO | WO-2005122453 A1 | 12/2005 |
| WO | WO-2008030363 A2 | 3/2008 |
| WO | WO-2008030363 A3 | 3/2008 |
| WO | WO-2008091675 | 7/2008 |
| WO | WO-2008106032 A2 | 9/2008 |

OTHER PUBLICATIONS

"U.S. Appl. No. 10/863,609, Appeal Brief filed Mar. 19, 2008", 24 pgs.

"U.S. Appl. No. 11/679,527, Examiner Interview Summary mailed Mar. 24, 2009", 2 pgs.

"U.S. Appl. No. 11/679,527, Response filed May 15, 2009 to Final Office Action mailed Jan. 15, 2009", 10 pgs.

"Chinese Application Serial No. 03815384.X , Office Action Mailed Apr. 10, 2009", 5 pgs.

"Indian Application Serial No. 1983/KOLNP/2004, Office Action mailed on Feb. 16, 2009", 1 pg.

"U.S. Appl. No. 10/186,637, Non-Final Office Action mailed Dec. 19, 2005", 9 pgs.

"U.S. Appl. No. 10/186,637, Notice of Allowance mailed Jul. 21, 2006", 6 pgs.

"U.S. Appl. No. 10/186,637, Response filed Apr. 19, 2006 Non-Final Office Action mailed Dec. 19, 2005", 15 pgs.

"U.S. Appl. No. 10/863,609, Response filed Apr. 1, 2006 Non-Final Office Action mailed Nov. 1, 2005.pdf", 11 pgs.

"U.S. Appl. No. 10/863,609, Response filed Oct. 22, 2007 to Final Office Action mailed Aug. 20, 2007", 7 pgs.

"U.S. Appl. No. 10/863,609, Advisory Action mailed Nov. 16, 2007", 2 pgs.

"U.S. Appl. No. 10/863,609, Final Office Action mailed Aug. 20, 2007", 13 pgs.

"U.S. Appl. No. 10/863,609, Non-Final Office Action mailed Jan. 17, 2007", 15 pgs.

"U.S. Appl. No. 10/863,609, Non-Final Office Action mailed Nov. 1, 2005", 11 pgs.

"U.S. Appl. No. 10/863,609, Non-Final Office Action mailed Jun. 13, 2006", 9 pgs.

"U.S. Appl. No. 10/863,609, Preliminary Amendment mailed Aug. 4, 2005", 3 pgs.

"U.S. Appl. No. 10/863,609, Response filed Oct. 13, 2006 Non-Final Office Action mailed Jun. 13, 2006", 9 pgs.

"U.S. Appl. No. 10/863,609, Response filed May 17, 2007 Non-Final Office Action mailed Jan. 17, 2007", 12 pgs.

"CAPTCHA", http://en.wikipedia.orq/wiki/CAPTCHA, From Wikipedia, the free encyclopedia,(Aug. 21, 2006).

"History—First Use—Alta-Vista", http://www2.parc.com/istl/projects/captcha/history.htm, Parc Captcha,(2003).

"International Application Serial No. 03762197.6-2211, Supplemental Search Report Oct. 9, 2007", 4 pgs.

Chellapilla, K. , et al., "Building segmentation based human-friendly human interaction proofs (HIPs)", *Lecture notes in computer science*, Human interactive proofs. International workshop No. 2, Bethlehem PA,(2005),1-27.

Chellapilla, K. , et al., "Computers beat Humans at Single Character Recognition in Reading based Human Interaction Proofs (HIPs).", *CEAS 2005*, Conference on Email and Anti-Spam 2005,(2005),1-8.

Chellapilla, K. , et al., "Designing human friendly human interaction proofs (HIPs)", *Proceedings of the SIGCHI conference on Human factors in computing systems*, (2005),711-720.

Chellapilla, K. , et al., "Using Machine Learning to Break Visual Human Interaction Proofs (HIPs)", *Advances in Neural Information Processing Systems 17, Neural Information Processing Systems (NIPSÂ?2004)*, (2004),1-8.

Chew, M. , et al., "Image Recognition CAPTCHAs", *EECS Department University of California, Berkeley, Technical Report* No. UCB/CSD-04-1333 2004, (2004),1-19.

Coates, A. , et al., "Pessimal Print: A Reverse Turing Test", *Proceedings of the Sixth International Conference on Document Analysis and Recognition (ICDAR)*, (2001),1-5.

Naor, Moni , "Verification of a human in the loop or Identification via the Turing Test", *Unpublished draft from http://www.wisdom.weizmann.ac.il/~naor/PAPERS/_human_abs.html*, (1996).

Von Ahn, Luis , et al., "CAPTCHA: Using Hard AI Problems For Security", *Proceedings of Eurocrypt*, (2003),294-311.

"U.S. Appl. No. 11/679,527, Final Office Action mailed Jan. 15, 2009", 15 pgs.

"U.S. Appl. No. 11/679,527, Response filed Sep. 25, 2008 to Non-Final Office Action mailed Mar. 25, 2008", 13 pgs.

"European Application Serial No. 03762197.6, Office action Mailed Dec. 17, 2008", 3 pgs.

"European Application Serial No. 04780519.7, Office action Mailed Jan. 22, 2009", 5 pgs.

"International Application Serial No. PCT/US2008/002208, International Search Report and Written Opinion mailed Aug. 18, 2008", 13 pgs.

"Korean Application Serial No. 2007-7000370, Office Action mailed Aug. 18, 2008", 5 pgs.

Adnan, Masood, "15 Seconds : Fighting Spambots with NET and AI", [Online]. *Retrieved from the Internet*: <URL: http://www.15seconds.com/Issue/040202.htm>, (Feb. 2, 2004), 16 pgs.

Baird, H S, et al., "Human interactive proofs and document image analysis", *Lecture Notes in Computer Science, 2423, Proceedings of the 5th International Workshop on Document Analysis Systems V*, XP002341909, Jan. 2002 , 507-518.

Mori, G, et al., "Recognizing objects in adversarial clutter: breaking a visual CAPTCHA", Proceedings. 2003 IEEE Computer Society Conference on Computer Vision and Pattern Recognition, vol. 1,, XPO10644891, (Jun. 2003), 134-141.

Xu, J, et al., "Mandatory human participation: a new authentication scheme for building secure systems", *The 12th International Conference on Computer Communications and Networks 2003, ICCCN 2003. Proceedings.*, XP010695028, Oct. 2003 , 547-552.

*Microsoft Press Computer Dictionary, Third Edition*, The Comprehensive Standard for Business, School, Library, and Home,(1997).

"Search Report, "International Searching Authority", PCT/US03/20457, date mailed Jun. 27, 2003", (Oct. 3, 2003),1-4.

Baird, Henry S., et al., "Protecting Websites with Reading-Based CAPTCHAs", *2nd International Web Document Analysis Workshop (WDA'03)*, (Aug. 3, 2003),53-56.

Chew, Monica , et al., "BaffleText: a human interactive proof (5010-40)", *Document recognition and retrieval-Annual conference: 10th Proceedings SPIE The International Society for Optical Engineering*, (2003),305-316.

Courter, Gini, et al., *Mastering Microsoft (R) Office 2000 Professional Edition*, San Francisco : Sybex Inc.,(1999),pp. 5-7, 70-71, 151-157.

Matthias, Colin E., et al., "Blocking Techniques Against Malicious Robots", *Major Qualifying Project Report submitted to the Faculty of the Worcester Polytechnic Institute*, (Mar. 7, 2003),1-39.

Simard, Patrice Y., "Using Character Recognition and Segmentation to Tell Computer from Humans", *Proceeding of the Seventh International Conference on Document Analysis and Recognition*, (Aug. 3-6, 2003),418-423.

Spice, Byron , "Robot Solves Internet Robot Problem", *Pittsburgh Post-Gazette*, http://www.postgazette.com/healthscience/20011102blumside1021p4.asp,(Oct. 21, 2001),3 pages.

The CAPTCHA Project, et al., "Telling Humans and Computers Apart (Automatically)", http://www.captcha.net/, (2000),8 pages.

Von Ahn, Luis , "Telling Humans and Computers Apart (Automatically) or How Lazy Cryptographers do AI", *Communications of the ACM, 47(2)*. (Feb. 2004),56-60.

"Chinese Application Serial No. 200480043752.0, Office Action Mailed Nov. 20, 2009", 18 pages.

Baird, H. S, et al., "Human Interactive Proofs and Document Image Analysis", *Lecture Notes in Computer Science, Document Analysis Systems V*, vol. 2423/2002, (2002), 531-537.

Mori, G, et al., "Recognizing objects in adversarial clutter: breaking a visual CAPTCHA", *2003 IEEE Computer Society Conference on Computer Vision and Pattern Recognition, 2003. Proceedings*, vol. 1, (2003), I-134-I-141.

U.S. Appl. No. 11/679,527, Non-Final Office Action mailed Aug. 21, 2009, 14 pgs.

"Indian Application Serial No. 1983/KOLNP/2004 First Examiner's Report mailed Jul. 28, 2006", 13 pgs.

"International Application Serial No. PCT/US03/20457, International Search Report mailed Oct. 3, 2003", 4 pgs.

"International Application Serial No. PCT/US03/20457, Written Opinion mailed Jul. 29, 2004", 4 pgs.

"International Application Serial No. PCT/US04/25695, International Search Report mailed Mar. 21, 2005", 4 pgs.

"International Application Serial No. PCT/US04/25695, Written Opinion mailed Mar. 21, 2005", 3 pgs.

"International Application Serial No. PCT/US07/18907, International Search Report mailed Mar. 17, 2008", 4 pgs.

"International Application Serial No. PCT/US07/18907, Written Opinion mailed Mar. 17, 2008", 5 pgs.

"Korean Application Serial No. 2007-700037, Office Action mailed Feb. 19, 2008", 7 pgs.

Brelstaff, Gavin , et al., "Practical application of visual illusions: errare humanum est", *ACM International Conference Proceeding Series*; vol. 95 Proceedings of the 2nd symposium on Applied perception in graphics and visualization., (2005),161.

Imberman, Susan P., et al., "Three fun assignments for an Artificial Intelligence Class" *Journal of Computing Sciences in Colleges* vol. 21, Issue 2 (2005),113-118.

Von Ahn, Luis , et al., "Telling Humans and Computers Apart", *Communications of the ACM*. vol. 47. No. 2,(Feb. 2004),57-60.

"U.S. Appl. No. 11/679,527, Non-Final Office Action mailed Mar. 25, 2008", 9 Pgs.

"International Application Serial No. 03762197.03-2211, Examiner's Report mailed Jan. 2, 2008", 4 pgs.

Baird, H. S., et al., "Human Interactive Proofs and Document Image Analysis", *In Proceedings of the 5th International Workshop on Document Analysis Systems V*, vol. 2423,, (Aug. 19-21, 2002),507-518 pgs.

* cited by examiner

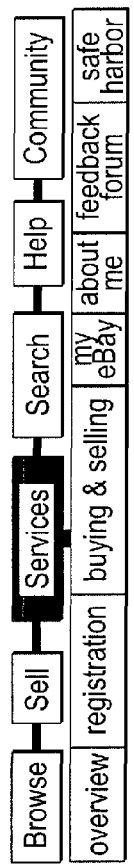

METHOD AND SYSTEM TO DETECT HUMAN INTERACTION WITH A COMPUTER

CROSS-REFERENCE TO RELATED APPLICATION

This application is a continuation of U.S. patent application Ser. No. 10/186,637 filed Jun. 28, 2002, which is herein incorporated by reference.

FIELD OF THE INVENTION

The invention relates to monitoring user interaction with a computer.

BACKGROUND OF THE INVENTION

A problem that often arises in an Internet environment is that of unauthorized or improper access to web sites by robots, commonly referred to as "bots". Bots are programs that are run on computers that automatically access a web site without the need for user interaction. Although some bots may access a web site for proper purposes, e.g., search engine spiders that are authorized to scrape information from web pages, other bots perform improper functions. For example, certain bots access web sites and register multiple fictitious users for improper purposes, access web site to mine confidential user information, guess user passwords, list items without authorization on sale or auction web sites, and so on. It will be appreciated that, due to the high processing power of computers running bots, a large number of unauthorized accesses may take place in an extremely short period of time. However, although unauthorized access by a user or human may still occur, it is a substantially slower process.

BRIEF DESCRIPTION OF THE DRAWINGS

The present invention is illustrated by way of example, and not limitation, in the figures of the accompanying drawings, in which like references indicate similar features.

In the drawings,

FIG. 6 shows a schematic representation of an exemplary user interface presented to the user on the computer;

FIG. 7 shows an exemplary user interface for a visually impaired user;

FIG. 8 shows an exemplary table for monitoring repetitive use of a token.

DETAILED DESCRIPTION

A method of, and system for, monitoring user interaction with a computer are described. In the following description, for purposes of explanation, numerous specific details are set forth in order to provide a thorough understanding of the present invention. It will be evident, however, to one skilled in the art that the present invention may be practiced without these specific details.

Figure 1:
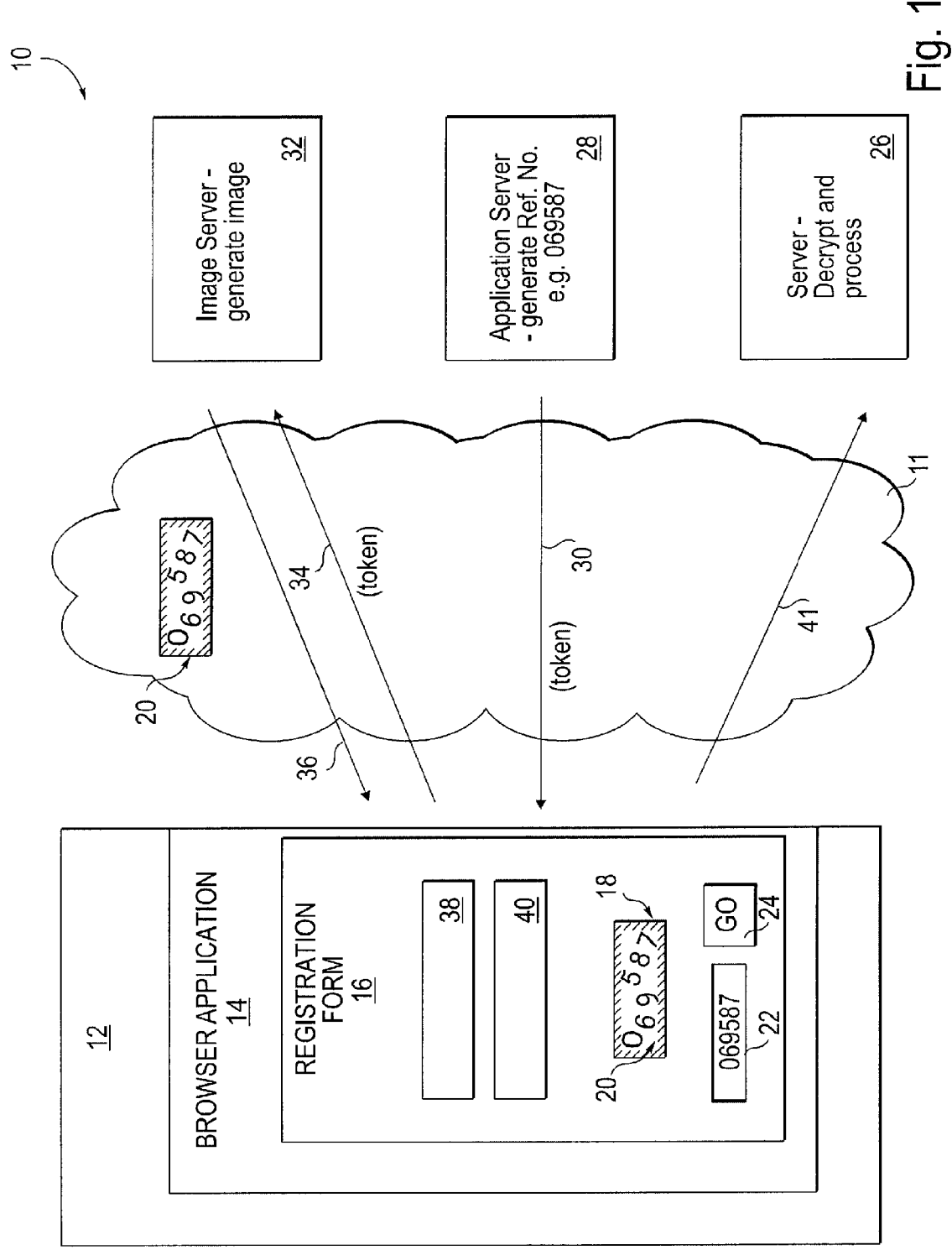
FIG. 1 shows a schematic block diagram of an exemplary system, in accordance with one aspect of the invention, for monitoring interaction between a user and a computer.

Referring in particular to FIG. 1, reference numeral 10 generally indicates a system, in accordance with an aspect of the invention, for monitoring user interaction with a computer 12. In one embodiment of the invention, the system 10 is used in an Internet environment where a user accesses a web site of an Internet service facility. Accordingly, the invention is described with reference to a user registration process via the Internet 11. However, it should be appreciated that the invention may be applied in any computer environment in which user interaction with the computer is to be monitored.

The computer 12 includes a web browser application 14, which generates a user interface such as an exemplary registration form 16. The registration form 16 includes a display zone 18 for displaying an image 20 including a random reference number and, in order to effect registration, a user is required to read the random reference number from the image 20 and enter it into a user data input field 22. In order to complete registration, the user activates a "GO" button 24 which then communicates the registration information to a registration server 26. As described in more detail below, the image 20 is distorted and modified to inhibit the acquisition of the reference number by an automated process such as a software robot using optical character recognition (OCR). However, the image 20 is sufficiently clear so that the user may read the reference number for entry into the input data field 22. Thus, in order to effect registration, human interaction with the computer 12 is required.

In one embodiment, the reference number is generated by an Internet application server 28, which passes the random number in reference data, e.g., in the form of a token, via the Internet 11 to the browser application 14 as shown by arrow 30. The browser application 14 then passes the token to an image server 32, as shown by arrow 34, during a HyperText Markup Language (HTML) image call. The image server 32 then decrypts the token and includes the reference number in the image 20 in a random fashion whereafter it is communicated, as shown by line 36, to the browser application 14 for inclusion in the display zone 18. After the user has entered the number into the user data input field 22, and completed other details in the registration form, e.g. completed details in the fields 38, 40, the token and the user input data in the field 22 are then communicated to the registration server 26. The registration server 26 then decrypts the token to obtain the reference number, and then compares the number entered by the user with the reference number and, if the numbers match, the registration server 26 may authenticate the user. However, in addition to comparing the two numbers, the registration server 26 also performs a checksum validation and time stamp analysis of the token, as described in more detail below.

Figure 2:
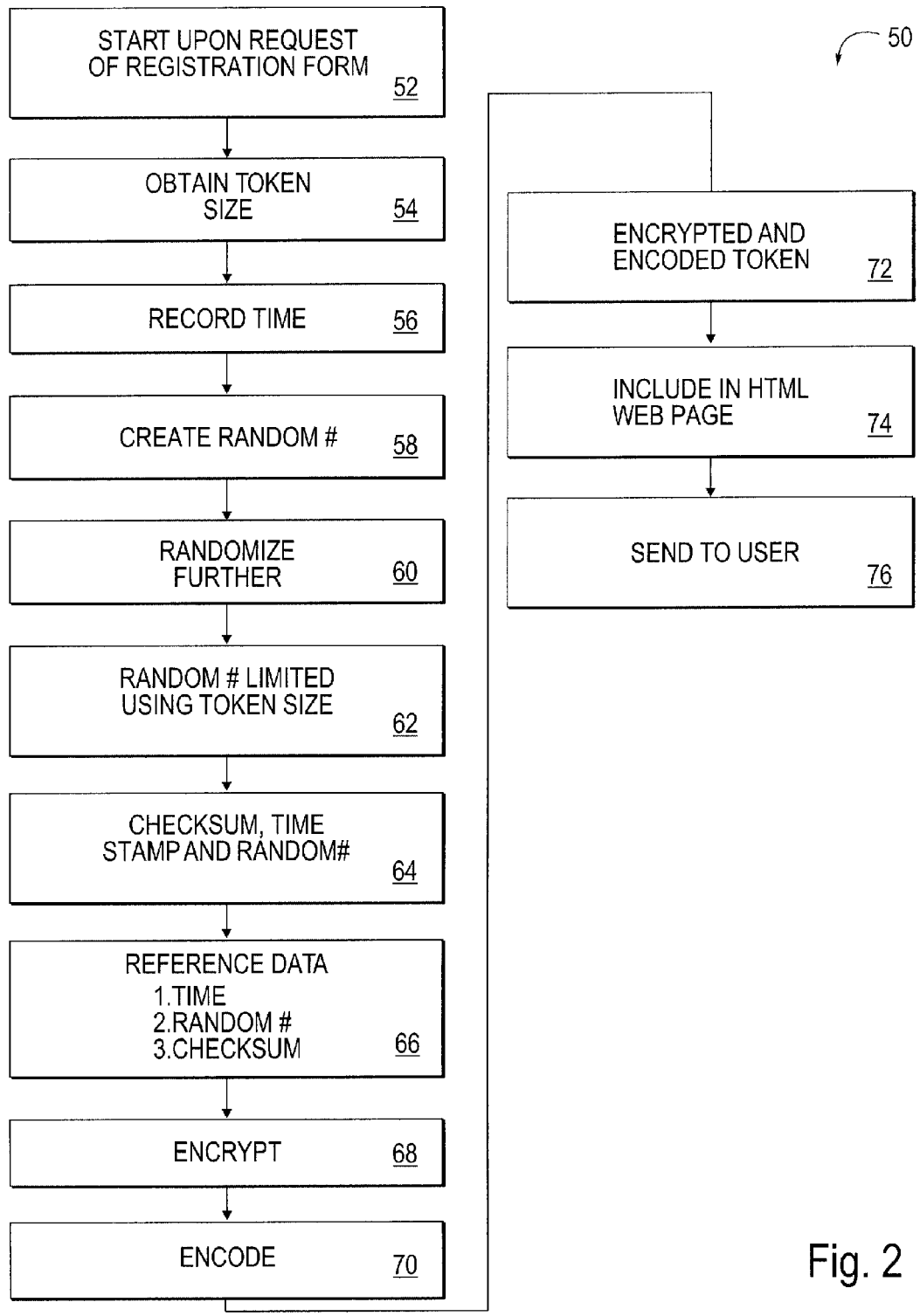
FIG. 2 shows a schematic flow diagram of an exemplary method, in accordance with another aspect of the invention, of generating reference data including a random reference string.

Referring in particular to FIG. 2, reference numeral 50 generally indicates an exemplary method, in accordance with an aspect of the invention, for generating random reference data including a reference string in the exemplary form of a random reference number, for inclusion in the image 20. In one embodiment, the method 50 is carried out in the application server 28. It is to be appreciated that, although the random reference string is in the form of a random reference number, in other embodiments, the random reference string may be numeric, alphanumeric characters and/or any graphical data. However, when the random reference string is in the form of a random number with numerical digits, the system 10 may be language independent.

In an exemplary registration process, the method 50 is initiated when the web browser application 14 requests a registration form from the application server 28 (see block 52). Thereafter, as shown at block 54, the particular token size, to convey the reference data, in the system 10 is determined and is time stamped in milliseconds (see block 56). The random reference number is generated as shown at block 58 and further randomized as shown at block 60. Thereafter, the reference number is limited in size (see block 62) to conform to the token size selected at block 54. A checksum of the time stamp and the reference number is then performed (see block 64) to produce reference data including time data, the reference number, and the checksum (see block 66) which is then encrypted, e.g. using BLOWFISH algorithm, as shown in block 68. The encrypted reference data is then Base64 encoded (see block 70) to produce an encrypted and encoded token (see block 72) which is then included in an HTML web page (see block 74) and sent to the user (see block 76 in FIG. 2 and arrow 30 in FIG. 1).

An example of the token including the reference data generated by the application server 28 is as follows:

| (64 bit) | (32 bit) | (32 bit) |
|---|---|---|
| 1595139460 | 069587 | 59991 |
| Time Stamp | Random # | Checksum |

The time stamp of the token (see block 56 in FIG. 2) indicates when the token was generated and, as described in more detail below, is used by the server 26 to determine whether or not the token has been used before in a valid registration process. The time stamp is typically the time on the application server 28 when the token was created.

Although in the embodiment described above, the token is communicated to the browser application 14 in an HTML web page, it is to be appreciated that it may also, in other embodiments, be passed in a cookie, in other forms, URLs, or the like. Further, the encryption of the token is typically by means of a private key and the random number is generated on-the-fly or dynamically when a request for the registration form 16 is received from the browser application 14. Accordingly, in one embodiment, no library of numbers or images is provided, and different reference data including the random number, is generated each time a request from the computer 12 is processed.

Figure 3:
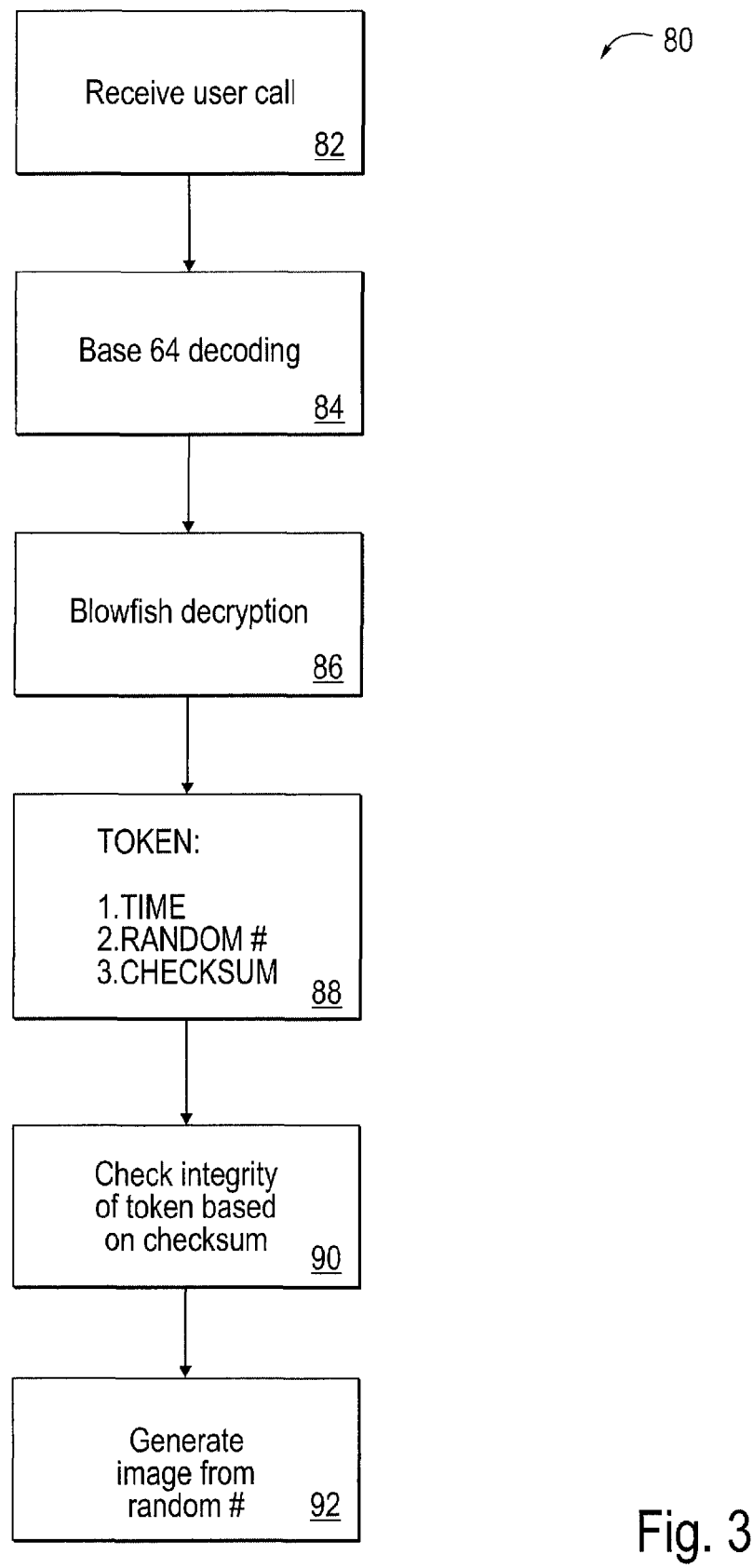
FIG. 3 shows a schematic flow diagram of an exemplary method, also in accordance with an aspect of the invention, of generating an image, readable by the user, including the random reference string.

When the browser application 14 performs an image call to the image server 32 to retrieve the image 20 for display in the web page received from the application server 28, it passes the encrypted and encoded token received from the application server 28, to the image server 32 as shown by the arrow 34 in FIG. 1. Referring in particular to FIG. 3 of the drawings, reference numeral 80 generally indicates an exemplary method, in accordance with a further aspect of the invention, for generating the image 20. As shown at block 82, the image server 32 receives the user call from the browser application 14 and identifies the token with the reference data and decodes the reference data using Base64 decoding (see block 84). Thereafter, the reference data is decrypted using BLOWFISH algorithm (see block 86) to obtain decoded and decrypted reference data including the time data, the reference number, and the checksum as shown at block 88. The integrity of the reference data is then checked based on the checksum as shown at block 90 whereafter the image 20 is generated.

Figure 4:
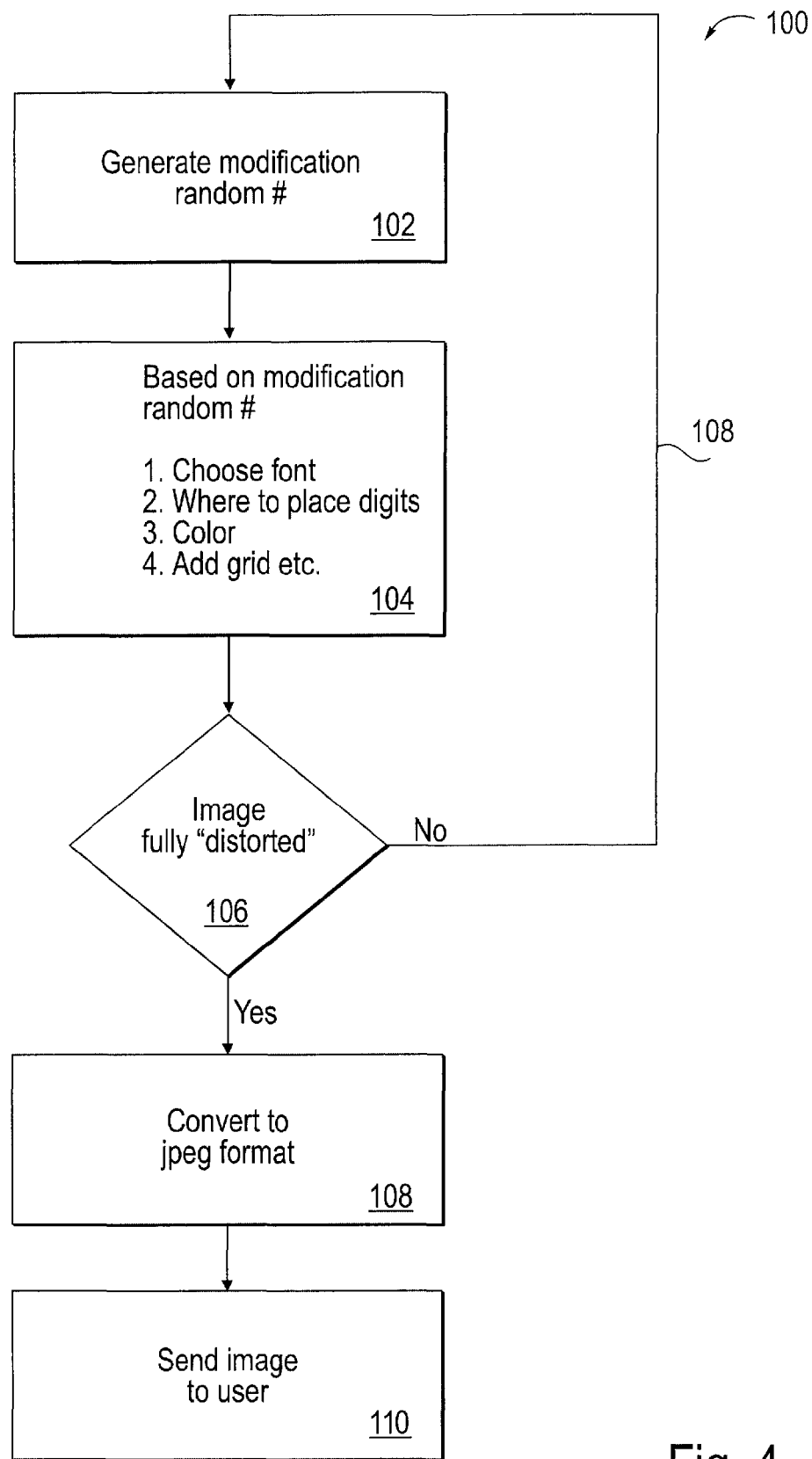
FIG. 4 shows a more detailed schematic flow diagram of the method of FIG. 3 showing inclusion of the random reference string in the image.

Referring in particular to FIG. 4, reference numeral 100 generally indicates an exemplary method, in accordance with an aspect of the invention, for generating the random image 20 including the random reference number. As shown at block 102, an image modification random number is generated at the image server 32 and, based on the image modification random number, the image is then created and modified. For example, the image modification random number may be used randomly to select one of a plurality of different fonts (see block 104) for each digit in the reference number thereby to inhibit the acquisition of the number by a robot. In one embodiment, a plurality of image modification random numbers may be iteratively generated, as shown by block 106 and line 108, and, in response to each random number, the position in the image 20 in which each digit is displayed may be randomly off-centered, various colors in which the digit is to be displayed may be randomly generated, a grid may be added to the image 20, random distortion or noise may be added to the image 20, and so on (see block 104). Once the image 20 has been sufficiently distorted, it is then converted to a jpeg format (see block 108) whereafter it is sent to the computer 12 as shown at block 110 in FIG. 4 and by the arrow 36 in FIG. 1.

In one embodiment, it is to be appreciated that as the image modification number is a random number, the image not only includes the random reference number, but also includes the number within the image in a random fashion. In one embodiment, the image is distorted or modified so that a modicum of human interpretation is required to assimilate or identify the reference number.

As mentioned above, the browser application 14 displays the image 20 in the display zone 18 so that the user may read the numbers provided therein and manually enter the digits, into the entry form or field 22 via a keyboard of the computer 12. Once the user has completed the entire registration form, the user typically activates the "GO" button 24 in response to which the browser application 14 communicates the user entered data, data entered into the form 16, and the token including the reference data to the server 26 as shown by arrow 41 in FIG. 1.

Figure 5:
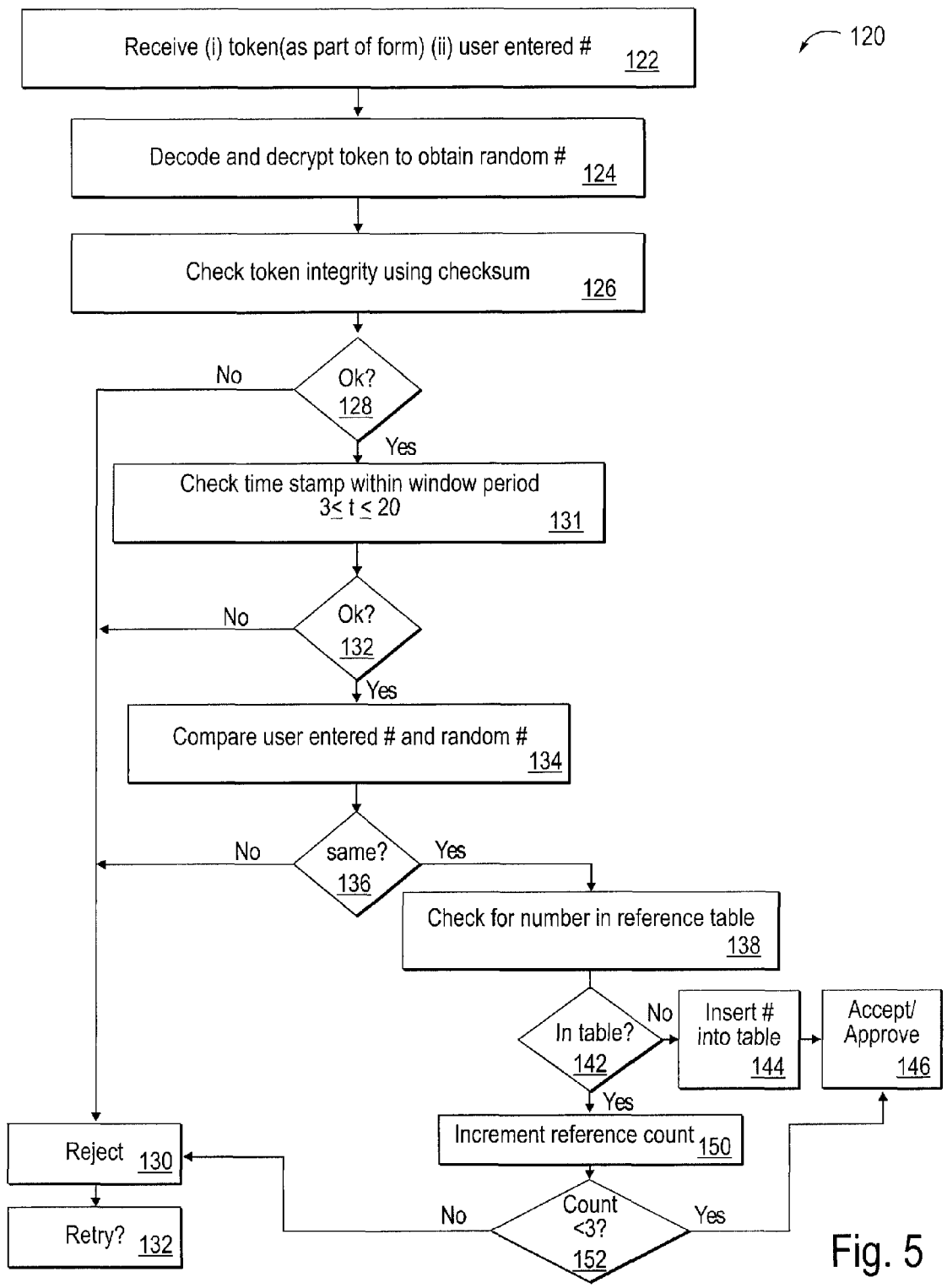
FIG. 5 shows a schematic flow diagram of an exemplary method, also in accordance with an aspect of the invention, of monitoring user interaction with the computer.

Referring in particular to FIG. 5, reference numeral 120 generally indicates an exemplary method, in accordance with an aspect of the invention, for monitoring user interaction with the computer 12. As shown at block 122, in one embodiment the server 26 receives the token including the reference data, as part of the form 16, as well as the user entered number. The reference data of the token is then Base64 decoded and decrypted using BLOWFISH algorithm to obtain the reference data including the random reference number (see block 124). As in the case of the server 32, the integrity of the reference data is then checked using the checksum (see block 126) and, as shown at decision block 128, if the integrity of the reference data of the token is rejected (see block 130), the user is then given a further opportunity of a limited number of opportunities (see block 132) to re-enter the number which is shown in the image 20.

However, returning to decision block 128, if the integrity of the reference data is accepted, then the time stamp of the token is checked to ensure that it is within a particular predetermined time range or window period as shown at block 131. In particular, and depending upon the amount of detail a user is required to enter into the registration form 16, a window period of about 3 to 20 minutes is allowed during which the reference data of the token is valid. If the time stamp indicates a time period of less than about 3 minutes or a time period of more than about 20 minutes, it is assumed that the registration attempt is either by a robot, or a replay attack in which multiple registration attempts using the same token are attempted. Accordingly, as shown at decision block 132, if the time stamp of the token is not within the window period, the registration attempt is rejected (see block 130).

However, if the time stamp is within the acceptable window period, the user entered number is compared with the reference number to see if they match, as shown at block 134. If the user entered number and the reference number do not match (see block 136) then the registration attempt is rejected (see block 130). In the embodiment depicted in the drawings in which the application server 28 performs the time stamping and the registration server 26 checks the time stamping, time on the servers 26, 28 is synchronized.

In certain circumstances, a user may inadvertently activate the "GO" button 24 more than once, for example, due to a slow refresh rate on a display screen. Thus, in certain embodiments, the reference data may be valid for more than one perceived registration attempt. In these circumstances, if the user entered number and the reference number match, a further check is conducted to determine if the same token has already been used as a basis for a registration validation (see block 138). In particular, the method 120 accesses a table 140 (see FIG. 8) to obtain usage information on the token and its reference data. As shown at decision block 142 in FIG. 5, if the number of the token is not included in the table 140, it is then inserted into the table 140 (see block 144) and its reference count is set at "1" (see column 148 in FIG. 8). Thereafter, the registration process is authenticated or effected, as shown at block 146.

However, returning to decision block 142, if the reference number associated with the token is included in the table 140, its reference count included in column 148 is incremented (see block 150) and the method 120 then checks to see if the count associated with the token exceeds a predetermined maximum number. For example, if the predetermined maximum number is three, then once the count in the table 140 has reached three, any registration attempt after that using the same reference number is rejected (see blocks 152 and 130 in FIG. 5). If, however, the account is less than three, then the registration process may be completed (see block 146).

In certain embodiments, the table 140 includes an age column 154, which is used to check whether or not the time stamp is within the predetermined window period (see block 131). A registration attempt may be selectively rejected dependent upon the count in column 148 and the age of the token as shown in column 154. Comments 156 in FIG. 8 show an exemplary application of the methodology described above in which the time window is 120 minutes and the maximum number of retry attempts using the same reference data is three.

An exemplary screen shot of an embodiment of a user interface served by the application server 28 to the browser application 14 is shown in FIG. 6. The user interface of FIG. 6 is typically generated using HTML and, as mentioned above, although the invention is described with reference to a registration process, it may be used to monitor user interaction with the computer 12 in any other circumstances. As the image 20 is modified in such a fashion that it inhibits identification of the reference number by a robot or any other automated process, the resultant image 20 may be difficult for a visually impaired person to read. Accordingly, as shown in FIG. 7, an alternative sign up or registration procedure may be provided in which a toll free number 158 is provided for a visually impaired person to call and thereby to effect registration.

In the embodiments described above, the servers 26, 28, and 32 are shown as separate servers, which may be located at different facilities. Thus, in one embodiment, the token communicated between the different servers may be the only interaction between the servers 26, 28, 32. In this embodiment, a single centralized table 140 may be provided on the server 26 and it need not be replicated on the servers 28 and 32. However, it will be appreciated that in other embodiments, any two or more of the servers may be combined into a single server.

Figure 9:
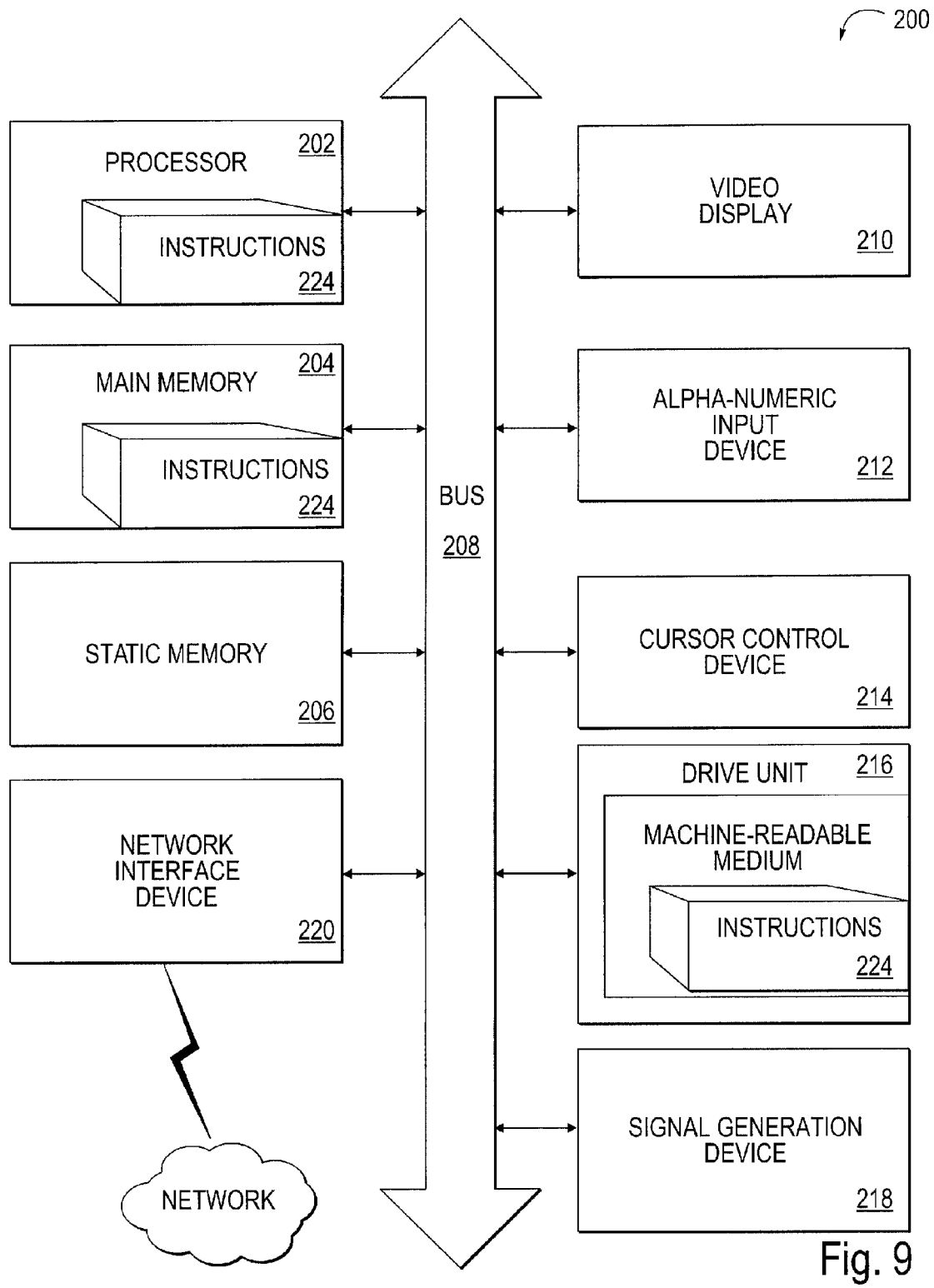
FIG. 9 shows schematic hardware architecture of an exemplary computer.

FIG. 9 shows a diagrammatic representation of machine in the exemplary form of a computer system 200 within which a set of instructions, for causing the machine to perform any one of the methodologies discussed above, may be executed. The computer 12 and servers 26, 28, and 32 may resemble the computer system 200.

In alternative embodiments, the machine may comprise a network router, a network switch, a network bridge, Personal Digital Assistant (PDA), a cellular telephone, a web appliance, Set-Top Box (STB) or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored a set of instructions (software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. While the machine-readable medium may reside on a single machine, it is also to be appreciated that it may reside on more than one machine in a distributed fashion.

Thus, a method and system for monitoring user interaction with a computer have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
   generating a random reference string;
   generating reference data, the reference data including the random reference string, a time stamp, and a checksum, the checksum being generated utilizing the random reference string and the time stamp;
   generating an image including the random reference string, the generating comprising off-centering each character in the random reference string;
   communicating the image to a computer for display to a user;
   receiving user input data; and
   comparing by one or more processor the random reference string and the user input data to detect human interaction with the computer.

2. The method of claim 1, in which the random reference string includes a plurality of numerical digits.

3. The method of claim 1, wherein the generating of the image including the random reference string comprises:
   generating an image modification random number; and
   including a reference number in the image dependent upon the image modification random number.

4. The method of claim 1, further comprising:
encrypting the reference data; and
communicating the encrypted reference data to the computer.

5. The method of claim 4, wherein the communicating of the encrypted reference data to the computer is via the Internet in at least one of group, the group comprising a web form, a Uniform Resource Locator (URL) and a cookie.

6. The method of claim 4, wherein the communicating of the encrypted reference data to the computer is during a registration process, the user input data being required to correspond to the reference string in order to effect registration.

7. The method of claim 4, further comprising Base64 encoding the encrypted reference data prior to the communicating of the encrypted reference data to the computer.

8. The method of claim 4, further comprising:
obtaining the time stamp from the encrypted reference data;
comparing the obtained time stamp with a reference time range; and
selectively authenticating the human interaction if the time stamp is within the reference time range.

9. The method of claim 8, further comprising:
incrementing a count associated with the reference data each time the reference data is received during the reference time range; and
selectively rejecting the human interaction if the count exceeds a reference count.

10. A computer system comprising:
a reference string generator to generate a random reference string;
a random reference data generator to generate reference data, the reference data including the random reference string, a time stamp, and a checksum, the checksum being generated utilizing the random reference string and the time stamp;
an image generator to generate an image including the random reference string, such that each character in the random reference string is off-centered;
a communications module to communicate the image to a client computer for display to a user and to receive user input data; and
a comparator to compare the random reference string and the user input data to detect human interaction with the computer.

11. A machine-readable medium having instruction data to cause a machine to:
generate a random reference string;
generate reference data, the reference data including the random reference string, a time stamp, and a checksum, the checksum being generated utilizing the random reference string and the time stamp;
generate an image including the random reference string, such that each character in the random reference string is off-centered;
communicate the image to a client computer for display to a user and to receive user input data; and
compare the random reference string and the user input data to detect human interaction with the computer.

12. An apparatus comprising:
means for generating a random reference string;
means for generating reference data, the reference data including the random reference string, a time stamp, and a checksum, the checksum being generated utilizing the random reference string and the time stamp;
means for generating an image including the random reference string, the generating comprising off-centering each character in the random reference string;
means for communicating the image to a computer for display to a user;
means for receiving user input data; and
means for comparing the random reference string and the user input data to detect human interaction with the computer.

13. A method comprising:
receiving a request;
generating random reference data, the random reference data being uniquely associated with the request, the random reference data including a random reference string, a time stamp, and a checksum, the checksum being generated utilizing the random reference string and the time stamp;
generating an image including the random reference string, the reference string being included in the image in a random fashion;
communicating the image to a computer for display to a user;
receiving user input data; and
comparing by one or more processor the random reference string from the random reference data and the user input data to detect human interaction with the computer.

14. The method of claim 13, wherein the including of the random reference data in the image in a random fashion comprises off-centering each character in the random reference string.

15. The method of claim 13, wherein the random reference string includes a plurality of numerical digits.

16. The method of claim 13, wherein the generating of the image including the random reference string includes:
generating an image modification random number; and
including a reference number in the image dependent upon the image modification random number.

17. A system computer comprising:
a communications module to receive a request;
a random reference data generator to generate random reference data, the random reference data being uniquely associated with the request, the random reference data including a random reference string, a time stamp, and a checksum, the checksum being generated utilizing the random reference string and the time stamp;
an image generator to generate an image including the random reference string, the random reference string being included in the image in a random fashion, the image to be communicated to a computer for display to a user and of the communications module to receive user input data associated with the image; and
a comparator to compare the random reference string and the user input data to detect human interaction with the computer.

18. A machine-readable medium having instruction data to cause a machine to:
receive a request;
generate random reference data, the random reference data being uniquely associated with the request, the random reference data including a random reference string, a time stamp, and a checksum, the checksum being generated utilizing the random reference string and the time stamp;
generate an image including the random reference string, the random reference string being included in the image in a random fashion;
communicate the image to a computer for display to a user;
receive user input data; and
compare the random reference string and the user input data to detect human interaction with the computer.

* * * * *

UNITED STATES PATENT AND TRADEMARK OFFICE
CERTIFICATE OF CORRECTION

PATENT NO.        : 7,770,209 B2                                    Page 1 of 1
APPLICATION NO.   : 11/533250
DATED             : August 3, 2010
INVENTOR(S)       : Eric N. Billingsley et al.

It is certified that error appears in the above-identified patent and that said Letters Patent is hereby corrected as shown below:

In column 8, line 45, in Claim 17, after "user" delete "and".

Signed and Sealed this

Twenty-eighth Day of September, 2010

David J. Kappos
*Director of the United States Patent and Trademark Office*